United States Patent [19]
Yishay et al.

[11] Patent Number: 5,483,660
[45] Date of Patent: Jan. 9, 1996

[54] METHOD AND APPARATUS FOR PERFORMING MULTIPLEXED AND NON-MULTIPLEXED BUS CYCLES IN A DATA PROCESSING SYSTEM

[75] Inventors: Oded Yishay; Joseph Jelemensky; Ann E. Harwood; Javier Saldana, all of Austin, Tex.

[73] Assignee: Motorola Inc., Schaumburg, Ill.

[21] Appl. No.: 158,584

[22] Filed: Nov. 29, 1993

[51] Int. Cl.$^6$ .................................................. G06F 13/38
[52] U.S. Cl. ..................... 395/280; 395/550; 395/800; 395/410; 365/189.02; 365/230.02; 364/DIG. 1; 364/232.9; 364/238; 364/240
[58] Field of Search ..................... 395/800, 550, 395/325; 364/DIG. 1, 232.9, 238, 240; 365/189.02, 230.02

[56] References Cited

U.S. PATENT DOCUMENTS

| | | | |
|---|---|---|---|
| 4,050,096 | 9/1977 | Bennett et al. | 364/200 |
| 4,816,996 | 3/1989 | Hill et al. | 364/200 |
| 4,958,277 | 9/1990 | Hill et al. | 364/200 |
| 5,048,012 | 9/1991 | Gulick et al. | 370/77 |
| 5,086,407 | 2/1992 | McGarity et al. | 395/800 |
| 5,151,986 | 9/1992 | Langan et al. | 395/550 |
| 5,262,991 | 11/1993 | Pope | 365/189.02 |
| 5,359,717 | 10/1994 | Bowles et al. | 395/325 |

OTHER PUBLICATIONS

Motorola, Inc., MC68332 User's Manual, Chapter 4: System Integration Module, pp. 4–27 through 4–46, 1990.

*Primary Examiner*—Alyssa H. Bowler
*Assistant Examiner*—Walter D. Davis, Jr.
*Attorney, Agent, or Firm*—Susan C. Hill

[57] ABSTRACT

Method and apparatus for performing multiplexed and non-multiplexed bus cycles in a data processing system (10). The present invention allows a data processing system (10) to switch from multiplexed bus cycles to non-multiplexed bus cycles, and vice-versa, without requiring the data processing system (10) to be reset. In one embodiment of the present invention, a single user programmable control bit (90) is used to select whether an external bus cycle will be multiplexed or non-multiplexed. In more complex embodiments of the present invention, the ability to switch between multiplexed external bus cycles and non-multiplexed external bus cycles may be achieved by way of a plurality of user programmable register fields (96, 100, 102, and 104) located in registers 44. The plurality of user programmable register fields (96, 100, 102, and 104) may be associated with one or more chip select signals.

21 Claims, 4 Drawing Sheets

METHOD AND APPARATUS FOR PERFORMING MULTIPLEXED AND NON-MULTIPLEXED BUS CYCLES IN A DATA PROCESSING SYSTEM

REFERENCE TO RELATED APPLICATIONS

The present application is related to the following U.S. patent applications:

"Method And Apparatus In A Data Processing System For Selectively Inserting Bus Cycle Idle Time", invented by Oded Yishay et al, having Ser. No. 08/158,575, filed concurrently herewith, and assigned to the assignee hereof; and "Integrated Circuit Microprocessor With Chip Select Logic", invented by James B. Eifert et al., having Ser. No. 07/432,423, filed Nov. 6, 1989, and assigned to the assignee hereof, which is expressly incorporated by this reference.

1. Field of the Invention

The present invention relates in general to a data processing system, and more particularly to a method and apparatus for performing multiplexed and non-multiplexed bus cycles in a data processing system.

2. Background of the Invention

Data processing systems, such as a microcomputer integrated circuit, are used with a wide range of peripheral devices, for example memory integrated circuits and application specific integrated circuits (ASICs). Some peripheral devices use multiplexed address and data busses, and some peripheral devices use non-multiplexed address and data busses.

In this document, the term "multiplexed" means that there is one set of bus conductors which are used as both the address bus conductors and the data bus conductors. During a first portion of a bus cycle, address signals are transferred across the conductors and the conductors are being used as an address bus. During a second portion of a bus cycle, data signals are transferred across the conductors and the conductors are being used as a data bus. Thus for a multiplexed bus, the function of the bus conductors is time multiplexed between a plurality of functions.

In this document, the term "non-multiplexed" means that there is a first set of bus conductors which are used only as the address bus conductors; and there is a second set of bus conductors which are used only as the data bus conductors. Thus during each bus cycle, the address signals can be transferred across the address bus conductors at the same time the data signals can be transferred across the data bus conductors.

In selecting whether to use a multiplexed bus or a non-multiplexed bus, there is a trade-off between speed and cost. Generally, a non-multiplexed bus can transfer more information during a predetermined number of bus cycles because both the address signals and the data signals can be transferred in parallel across separate conductors. Unfortunately, however, a non-multiplexed bus requires more conductors, which may add a significant cost.

Many memory devices require use of a non-multiplexed bus. The non-multiplexed bus allows the memory device to provide a faster access time and thus better performance. On the other hand, however, a significant number of application specific integrated circuits (ASICs) require use of a multiplexed bus. The multiplexed bus allows the ASICs to reduce the number of conductors required, and thus reduce the cost.

A problem arises, however, when a customer wishes to include both non-multiplexed peripherals (e.g. fast memories) and multiplexed peripherals (e.g. inexpensive ASICs) in the same system, without sacrificing performance.

At present, there are prior art microcomputer integrated circuits which can be configured during reset to be in either a multiplexed bus mode or a non-multiplexed bus mode. However, once the prior art microcomputer comes out of reset, the microcomputer is frozen in one of the two modes and cannot communicate with both multiplexed and non-multiplexed peripherals. The prior art microcomputer can only change from one mode to the other by resetting the entire microcomputer, which is a catastrophic event for many systems using a microcomputer. In addition, a significant amount of time is required in order to reset the prior art microcomputer. Thus resetting the prior art microcomputer between an access to a multiplexed peripheral and an access to a non-multiplexed peripheral is not a feasible solution in most systems using a microcomputer.

SUMMARY OF THE INVENTION

The previously mentioned needs are fulfilled and other advantages achieved with the present invention. In one form, the present invention is a data processing system having a processor, a first plurality of bus terminals, a second plurality of bus terminals, a first control register portion for storing a first control value, and a control circuit for receiving the first control value. The first control register portion selects a non-multiplexed mode if the first control value has a first mode value. The first control register portion selects a multiplexed mode if the first control value has a second mode value. The first control register portion is coupled to the processor.

If the first control value is the first mode value, the control circuit transfers a plurality of address signals on the first plurality of bus terminals and transfers a plurality of data signals on the second plurality of bus terminals. If the first control value is the second mode value, the control circuit transfers the plurality of address signals on a predetermined one of the first plurality of bus terminals and the second plurality of bus terminals, and transfers the plurality of data signals on the predetermined one of the first plurality of bus terminals and the second plurality of bus terminals. The control circuit is coupled to the first plurality of bus terminals, to the second plurality of bus terminals, and to the first control register portion. In addition, the first control register portion is write accessible by the processor.

In an alternate form, the present invention is a method for providing address and data signals in a data processing system. The data processing system has a first bus and a second bus. The method includes the step initiating a first bus cycle in response to receiving a first plurality of address signals. If a first control value is a first mode value, the method includes the step of transferring the first plurality of address signals on the first bus and transferring a first plurality of data signals on the second bus during the first bus cycle. If the first control value is a second mode value, the method includes the step of transferring the first plurality of address signals on a predetermined one of the first bus and the second bus and transferring the first plurality of data signals on the predetermined one of the first bus and the second bus during the first bus cycle.

The method also includes the step of initiating a second bus cycle in response to receiving a second plurality of address signals. If the first control value is the first mode value, the method includes the step of transferring the second plurality of address signals on the first bus and transferring a second plurality of data signals on the second bus during the second bus cycle. If the first control value is the second mode value, the method includes the step of transferring the second plurality of address signals on the predetermined one of the first bus and the second bus and transferring the second plurality of data signals on the predetermined one of the first bus and the second bus during the second bus cycle. In addition, the first bus cycle and the second bus cycle are adjacent bus cycles.

The present invention will be understood by one skilled in the art from the detailed description below in conjunction with the accompanying drawings.

DESCRIPTION OF THE PREFERRED EMBODIMENT

Figure 1:
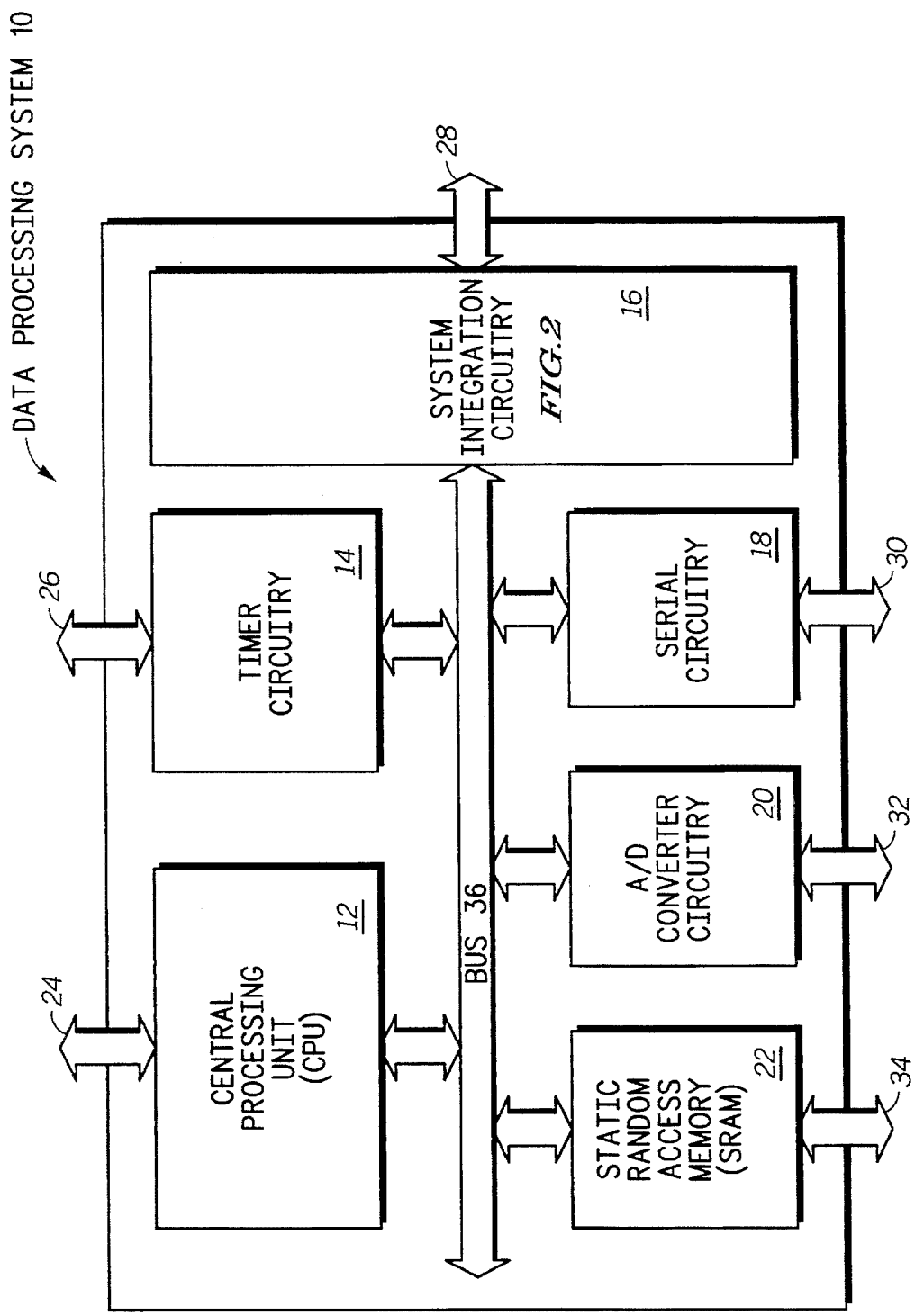
FIG. 1 illustrates, in block diagram form, a data processing system 10 in accordance with one embodiment of the present invention.

The present invention allows a data processing system 10 to switch from multiplexed bus cycles to non-multiplexed bus cycles, and vice-versa, without requiring the data processing system to be reset. In one embodiment of the present invention, a single user programmable control bit is used to select whether an external bus cycle will be multiplexed or non-multiplexed. In more complex embodiments of the present invention, the ability to switch between multiplexed bus cycles and non-multiplexed bus cycles may be achieved by way of a plurality of user programmable register fields located in registers 44 (see FIG. 2).

In one embodiment of the present invention, the user, on a per bus cycle basis, has the option of forcing bus cycles with multiplexed address and data to occur on an external bus which has been configured to be in a non-multiplexed pin configuration mode. In this same embodiment, an option register 46, a base register 48, and a MUX control bit 96, are associated with each one of the chip select terminals 73. If the MUX control bit 96 for the corresponding chip select is asserted, then the access to the corresponding address range will be done by multiplexing address and data signals on the same conductors, regardless of the external bus configuration of the system.

The term "bus" will be used to refer to a plurality of signals or conductors which may be used to transfer one or more various types of information, such as data, addresses, control, or status. The terms "assert" and "negate" will be used when referring to the rendering of a signal, status bit, or similar apparatus into its logically true or logically false state, respectively. If the logically true state is a logic level one, the logically false state will be a logic level zero. And if the logically true state is a logic level zero, the logically false state will be a logic level one.

The present invention can be more fully understood with reference to FIGS. 1–5. FIG. 1 illustrates a data processing system 10 that includes a central processing unit (CPU) 12, timer circuitry 14, system integration circuitry 16, serial circuitry 18, A/D converter circuitry 20, and static random access memory (SRAM) 22, which are all bi-directionally coupled to bus 36. CPU 12 is optionally coupled external to data processing system 10 by way of integrated circuit terminals 24. Timer 14 is coupled external to data processing system 10 by way of integrated circuit terminals 26.

System integration circuitry 16 is coupled external to data processing system 10 by way of integrated circuit terminals 28. Serial circuitry 18 is coupled external to data processing system 10 by way of integrated circuit terminals 30. A/D converter circuitry 20 is coupled external to data processing system 10 by way of integrated circuit terminals 32. SRAM 22 is optionally coupled external to data processing system 10 by way of one or more integrated circuit terminals 34. In one embodiment, data processing system 10 is a microcomputer formed on a single integrated circuit. In one embodiment of the present invention, integrated circuit terminals 24, 26, 28, 30, 32, and 34 are integrated circuit bonding pads. In another embodiment of the present invention, integrated circuit terminals 24, 26, 28, 30, 32, and 34 are integrated circuit pins.

Figure 2:
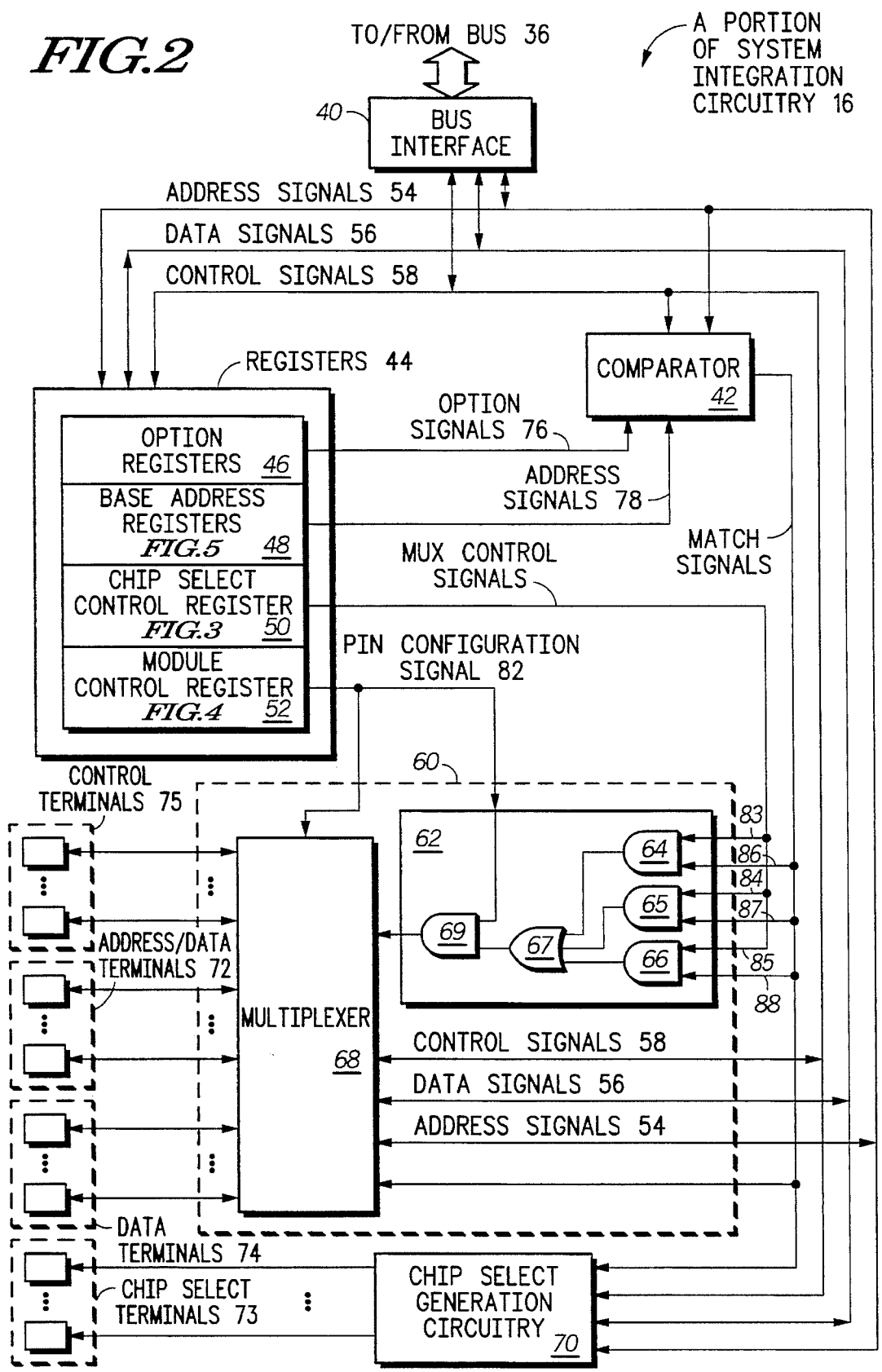
FIG. 2 illustrates, in partial block diagram form and partial schematic diagram form, a portion of system integration circuitry 16 of FIG. 1 in accordance with one embodiment of the present invention.

FIG. 2 illustrates a portion of system integration circuitry 16. The illustrated portion of system integration circuitry 16 includes bus interface circuitry 40 which is bi-directionally coupled to bus 36. Address signal conductors 54 are coupled to bus interface 40, comparator circuitry 42, registers 44, multiplexer circuitry 68, and chip select generation circuitry 70. Data signal conductors 56 are coupled to bus interface 40, registers 44, multiplexer 68, and chip select generation circuitry 70. Control signal conductors 58 are coupled to bus interface 40, comparator 42, registers 44, multiplexer 68, and chip select generation circuitry 70.

Registers 44 include option registers 46, base address registers 48, chip select control register 50, and module control register 52. Chip select control register 50 provides a MUX control bit 90 (see FIG. 3) to a first input of AND-gate 64 by way of conductor 83. Chip select control register 50 provides a MUX control bit 92 (see FIG. 3) to a first input of AND-gate 65 by way of conductor 84. And, chip select control register 50 provides a MUX control bit 94 (see FIG. 3) to a first input of AND-gate 66 by way of conductor 85.

Comparator 42 is coupled to option registers 46 by way of option signal conductors 76. Comparator 42 is coupled to base address registers 48 by way of address signal conductors 78. Comparator 42 provides a plurality of match signals to circuit 62, to multiplexer 68, and to chip select generation circuitry 70. Comparator 42 provides a first match signal to a second input of AND-gate 64 by way of conductor 86. Comparator 42 provides a second match signal to a second input of AND-gate 65 by way of conductor 87. And, comparator 42 provides a third match signal to a second input of AND-gate 66 by way of conductor 88. The output of AND-gate 64 is coupled to a first input of OR-gate 67. The output of AND-gate 65 is coupled to a second input of OR-gate 67. And, the output of AND-gate 66 is coupled to a third input of OR-gate 67.

Module control register 52 (see FIG. 4) provides one of the pin configuration control bits 100 to a first input of AND-gate 69 (i.e. pin configuration signal 82 in FIG. 2). The output of OR-gate 67 is coupled to a second input of AND-gate 69. The output of AND-gate 69 is coupled to multiplexer 68. Module control register 52 provides one or more of the pin configuration control bits 100 (see FIG. 4) to multiplexer 68. A circuit 62 includes AND-gates 64–66, OR-gate 67, and AND-gate 69. A circuit 60 includes multiplexer 68 and circuit 62.

Multiplexer 68 is bi-directionally coupled to a plurality of address/data terminals 72, to a plurality of data terminals 74, and to a plurality of control terminals 75. Chip select generation circuitry 70 is coupled to a plurality of chip select terminals 73. In one embodiment of the present invention, integrated circuit terminals 28 of FIG. 1 include address/data terminals 72, data terminals 74, control terminals 75, and chip select terminals 73.

Figure 3:
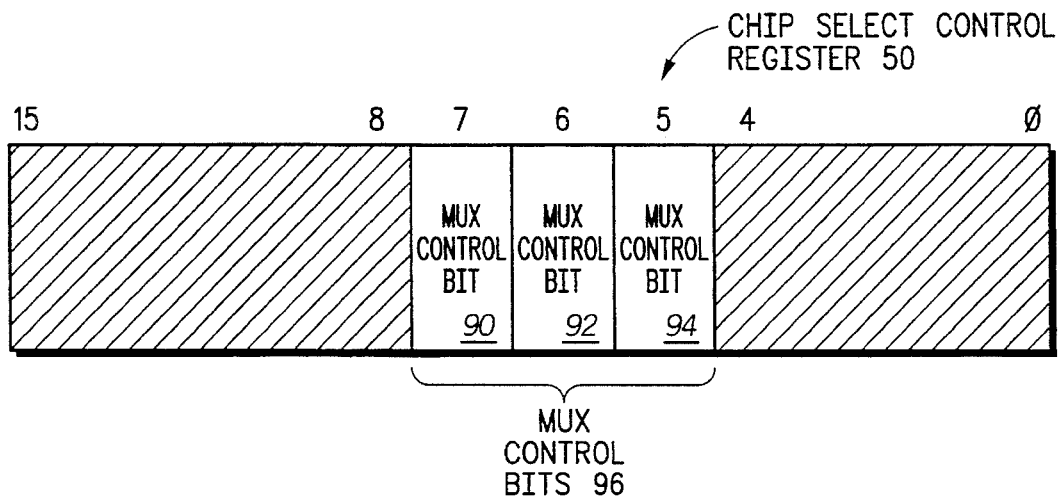
FIG. 3 illustrates, in block diagram form, a chip select control register 50 of FIG. 2 in accordance with one embodiment of the present invention.

FIG. 3 illustrates one possible embodiment of chip select control register 50 of FIG. 2. In the illustrated embodiment, chip select control register 50 has a plurality of MUX control bits 96. In one embodiment of the present invention, MUX control bits 96 include a MUX control bit 90, a MUX control bit 92, and a MUX control bit 94. In alternate embodiments of the present invention, chip select control register 50 may include other control bits (not shown). For example, in alternate embodiments of the present invention, chip select control register 50 may include other control bits (not shown) which are provided to chip select generation circuitry 70 and which are used to affect the behavior of chip select terminals 73 or system integration circuitry 16.

Also, in alternate embodiments of the present invention, there may be any number of MUX control bits 96. In some embodiments of the present invention, there is one MUX control bit 96 for each chip select terminal 73. In yet other embodiments, the functionality of the MUX control bits 96 may be encoded into fewer bits, or may be combined with other functions and may be encoded into more or fewer bits. Note that if the functionality of MUX control bits 96 is encoded, a decoder (not shown) may be required between chip select control register 50 and circuit 62 in order to properly decode the encoded control bits. Alternately, the circuitry in circuit 62 may be modified so that no decoding is required.

In one embodiment of the present invention, if MUX control bit 90 is a logic level one, a multiplexed mode is selected and any access to the corresponding block of memory will be performed using multiplexed address and data signals on address/data terminals 72. However, if MUX control bit 90 is a logic level zero and pin configuration signal 82 is a logic level one, a non-multiplexed mode is selected and any access to the corresponding block of memory will be performed using non-multiplexed address signals on address/data terminals 72 and non-multiplexed data signals on data terminals 74.

Similarly, if MUX control bit 92 is a logic level one, a multiplexed mode is selected and any access to the corresponding block of memory will be performed using multiplexed address and data signals on address/data terminals 72. However, if MUX control bit 92 is a logic level zero and pin configuration signal 82 is a logic level one, a non-multiplexed mode is selected and any access to the corresponding block of memory will be performed using non-multiplexed address signals on address/data terminals 72 and non-multiplexed data signals on data terminals 74.

Similarly, if MUX control bit 94 is a logic level one, a multiplexed mode is selected and any access to the corresponding block of memory will be performed using multiplexed address and data signals on address/data terminals 72. However, if MUX control bit 94 is a logic level zero and pin configuration signal 82 is a logic level one, a non-multiplexed mode is selected and any access to the corresponding block of memory will be performed using non-multiplexed address signals on address/data terminals 72 and non-multiplexed data signals on data terminals 74.

Figure 4:
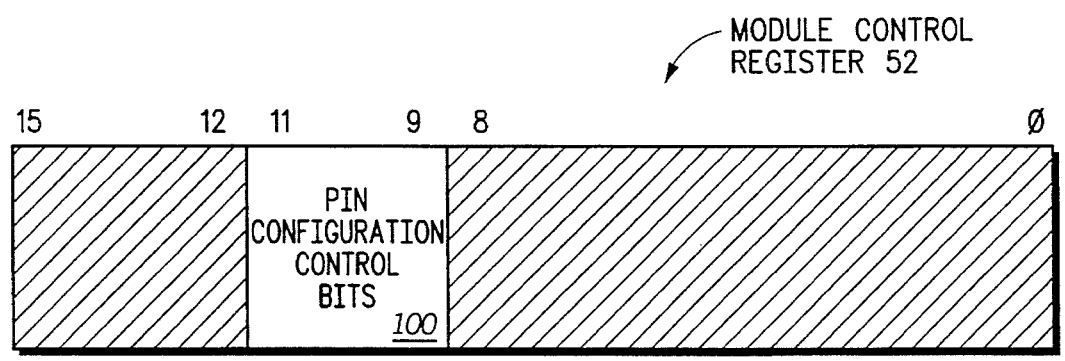
FIG. 4 illustrates, in block diagram form, a module control register 52 of FIG. 2 in accordance with one embodiment of the present invention.

FIG. 4 illustrates one possible embodiment of module control register 52 of FIG. 2. In the illustrated embodiment, module control register 52 has a plurality of pin configuration control bits 100. In one embodiment of the present invention, pin configuration control bits 100 include a single bit which selects between a multiplexed pin configuration mode and a nonomultiplexed pin configuration mode. This single control bit is provided to the input of AND-gate 69 and to multiplexer 68 by way of pin configuration signal 82. Note that the pin configuration mode, as determined by the pin configuration control bits 100, is the default for all external bus accesses, regardless of the address range, unless overridden by the assertion of the output of AND-gate 69 (which forces multiplexed bus cycles). In an alternate embodiment, the default may be multiplexed bus cycles which can be overridden by non-multiplexed bus cycles.

In alternate embodiments of the present invention, there may be any number of pin configuration control bits 100. In some embodiments of the present invention, the functionality of one or more of the pin configuration control bits 100 may not be encoded. In yet other embodiments, the functionality of the pin configuration control bits 100 may be encoded into fewer bits, or may be combined with other functions and may be encoded into more or fewer bits. Note that if the functionality of the pin configuration control bits 100 is encoded, a decoder (not shown) may be required between module control register 52 and circuit 62 in order to properly decode the encoded control bits. Alternately, the circuitry in circuit 62 may be modified so that no decoding is required.

Also, in alternate embodiments of the present invention, module control register 52 may include other control bits (not shown). For example, in alternate embodiments of the present invention, module control register 52 may include other control bits (not shown) which are used to affect the behavior of system integration circuitry 16.

In one embodiment of the present invention, if a predetermined bit of pin configuration control bits 100 is a logic level zero, a multiplexed pin configuration mode is selected and any access to any allowable address will be performed using multiplexed address and data signals on address/data terminals 72. On the other hand, if the predetermined bit of pin configuration control bits 100 is a logic level one, a non-multiplexed pin configuration mode is selected. However, if the non-multiplexed pin configuration mode is selected, MUX control bits 96 can override the pin configuration control bits 100 and can determine, on a per bus cycle basis, whether each external bus cycle will be multiplexed or non-multiplexed.

Figure 5:
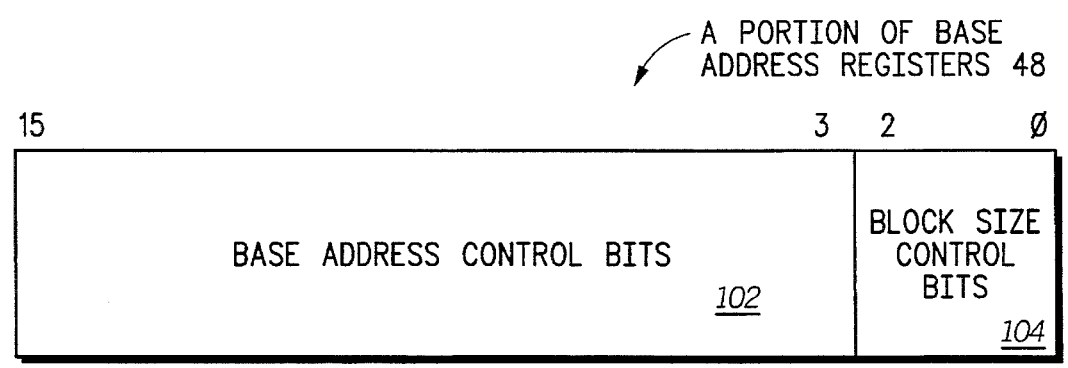
FIG. 5 illustrates, in block diagram form, a portion of base address registers 48 of FIG. 2 in accordance with one embodiment of the present invention.

FIG. 5 illustrates one possible embodiment of a portion of base address registers 48 of FIG. 2. In one embodiment of the present invention, there is a base address register for each of the chip select terminals 73. FIG. 5 illustrates one of the plurality of base address registers 48. Each of the base address registers 48 has a plurality of base address control bits 102 and a plurality of block size control bits 104.

In one embodiment of the present invention, a user of data processing system 10 programs base address control bits 102 and block size control bits 104 in one of the base address registers 48 in order to select a block of memory (i.e. an address range) for a corresponding one of the chip select terminals 73. Because each of the chip select terminals 73 has a corresponding base address register, each chip select terminal 73 may be programmed to be asserted for a different address range. The base address control bits 102 and the block size control bits 104 are transferred to comparator 42 by way of address signals 78.

In alternate embodiments of the present invention, base address registers 48 may include other control bits (not shown). For example, in alternate embodiments of the present invention, base address registers 48 may include other control bits (not shown) which are used to affect the behavior of system integration circuitry 16.

Also, in alternate embodiments of the present invention, there may be any number of base address control bits 102 and any number of block size control bits 104. In addition, in alternate embodiments of the present invention, the functionality of the base address control bits 102 and the functionality of the block size control bits 104 may be encoded in a variety of ways using more or fewer bits. Alternately, the functionality of the base address control bits 102 and the functionality of the block size control bits 104 may be combined with other functions and may be encoded into more or fewer bits. Note that if the functionality of the base address control bits 102 and the functionality of the block size control bits 104 are encoded, a decoder (not shown) may be required between base address registers 48 and comparator 42 in order to properly decode the encoded control bits. Alternately, the circuitry in comparator 42 may be modified so that no decoding is required.

A detailed description of the use of base address registers and option registers for chip selects is described in a related, copending application entitled "Integrated Circuit Microprocessor With Chip Select Logic", invented by James B. Eifert et al., filed Nov. 6, 1989, which has been expressly incorporated herein above.

Figure 6:
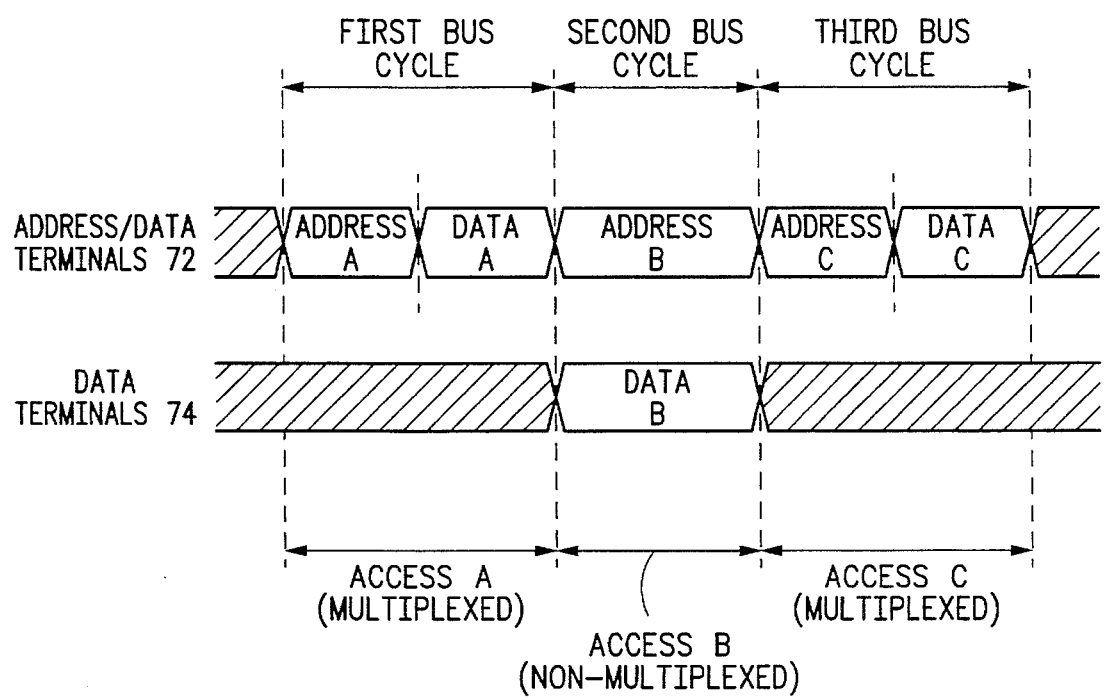
FIG. 6 illustrates, in timing diagram form, a plurality of adjacent bus cycles in accordance with one embodiment of the present invention.

FIG. 6 illustrates a plurality of adjacent bus cycles in accordance with one embodiment of the present invention. A multiplexed external bus access, labeled "access A", uses address/data terminals 72 to transfer both address signals (address A) and data signals (data A). A non-multiplexed external bus access, labeled "access B", uses address/data terminals 72 to transfer address signals (address B) and uses data terminals 74 to transfer data signals (data B). A multiplexed external bus access, labeled "access C", uses address/data terminals 72 to transfer both address signals (address C) and data signals (data C). Note that accesses using multiplexed bus cycles and accesses using non-multiplexed bus cycles can be performed on adjacent bus cycles.

As an example, a first chip select signal may be asserted on a first one of the chip select terminals 73 during both "access A" and "access C", while a second chip select signal may be asserted on a second one of the chip select terminals 73 during "access B". In this example, "access A" and "access C" may be accesses to the same multiplexed peripheral device, whereas "access B" may be an access to a non-multiplexed peripheral device. Note that no reconfiguration time delay and no reset is required between multiplexed and non-multiplexed bus cycles. Note also that once the determination has been made as to whether an access will be multiplexed or non-multiplexed, the actual access itself is performed in the prior art manner.

The operation of the present invention will now be discussed. The present invention allows data processing system 10 to switch from multiplexed bus cycles to non-multiplexed bus cycles, and vice-versa, without requiring data processing system 10 to be reset. On a per bus cycle basis, a user of data processing system 10 has the option of selecting either a multiplexed or a non-multiplexed bus cycle. In one embodiment of the present invention, the ability to switch between multiplexed bus cycles and non-multiplexed bus cycles is achieved by way of user programmable registers 44.

In one embodiment of the present invention, CPU 12 can initiate read accesses and write accesses to registers 44. Registers 44 are read and write accessible by way of bus 36, bus interface 40, address signals 54, data signals 56, and control signals 58. A user of data processing system 10 is able to program option registers 46 by writing a value to option registers 46, is able to program base address registers 48 by writing a value to base address registers 48, is able to program chip select control register 50 by writing a value to chip select control register 50, and is able to program module control register 52 by writing a value to module control register 52.

In one embodiment of the present invention, CPU 12 is able to initiate external bus cycles which use address/data terminals 72 (and possibly data terminals 74) to transfer information to and/or from external devices (not shown) which are external to data processing system 10. Note that some embodiments of the present invention use control terminals 75 to provide and receive control signals during external bus cycles. For example, to initiate an external write bus cycle, CPU 12 transfers address, data, and control signals to system integration circuitry 16 by way of bus 36. In alternate embodiments of the present invention, other portions of circuitry in data processing system 10 (not shown) may initiate external bus cycles.

In one embodiment of the present invention, bus interface 40 provides the address signals from bus 36 to address signal conductors 54, transfers the data signals between bus 36 and data signals 56, and transfers the control signals between bus 36 and control signal conductors 58. Comparator 42 then performs a compare operation to compare option signals 76 and predetermined ones of control signals 58. The logic states of option signals 76 are determined by the logic states of one or more predetermined control bits (not shown) in option registers 46. In addition, comparator 42 also performs a compare operation to compare address signals 78 and predetermined ones of address signals 54. The logic states of address signals 78 are determined by the logic states of one or more predetermined control bits in base address registers 48.

In one embodiment of the present invention, each chip select terminal 73 has a corresponding base address register in base address registers 48 (see FIG. 2 and FIG. 5). Likewise, each chip select terminal 73 has a corresponding option register in option registers 46 (see FIG. 2). In one embodiment of the present invention, chip select terminals 73 include three chip select terminals. As a result, there are three option registers 46 and three base address registers 48. One option register 46 and base register 48 pair is associated with each one of the chip select terminals 73.

As an example, if the address signals 78 and the option signals 76 match for a first one of chip select terminals 73, then the corresponding match signal, namely the match signal transferred on conductor 86, is asserted. Likewise, if the address signals 78 and the option signals 76 match for a second one of chip select terminals 73, then the corresponding match signal, namely the match signal transferred on conductor 87, is asserted. Likewise, if the address signals 78 and the option signals 76 match for a third one of chip select terminals 73, then the corresponding match signal, namely the match signal transferred on conductor 88, is asserted.

Other control bits (not shown) in option registers 48 may be used to affect the response of system integration circuitry 16 in the event of an address and option match. For example, these other control bits (not shown) may be used to determine the required data transfer size, the required function codes, or the required timing associated with the assertion of a chip select signal on chip select terminals 73.

Note that in one embodiment of the present invention, there is only one chip select control register 50 and one module configuration register 52, regardless of the number of chip select terminals 73. In alternate embodiments of the present invention, the bit fields in registers 44 may have fewer or more bits. Also, the bits fields in registers 44 may be located in different registers or may be located in a different portion of the same register.

In one embodiment of the present invention, module control register 52 (see FIG. 2 and FIG. 4) includes pin configuration control bits 100. These bits select between a multiplexed pin configuration mode and a non-multiplexed pin configuration mode. In one embodiment of the present invention, if the multiplexed pin configuration mode is selected, all external bus cycles will use multiplexed address and data signals on the address/data terminals 72. However, if the non-multiplexed pin configuration mode is selected, MUX control bits 96 can override the pin configuration control bits 100 and can determine, on a per bus cycle basis, whether each external bus cycle will be multiplexed or non-multiplexed.

Alternate embodiments of the present invention may not even use pin configuration control bits 100. If pin configuration control bits 100 are not used, circuit 62 will not include AND-gate 69, and the output of OR-gate 67 will be provided directly to multiplexer 68. As a result, the MUX control bits 96 alone will determine whether the accesses to a particular range of addresses will use multiplexed or non-multiplexed external bus cycles.

Note that a first address range may use multiplexed bus cycles, while a second address range may use non-multiplexed bus cycles. Thus a read or write external bus cycle to the first address range may be a multiplexed bus cycle; whereas a subsequent bus cycle to the second address range may be a non-multiplexed bus cycle. And unlike the prior art, a reset of the entire data processing system 10 is not required between the multiplexed bus cycle and the non-multiplexed bus cycle. For purposes of this document, adjacent bus cycles are bus cycles which occur sequentially in time and which have no reset and no other bus cycles inserted between them. Note that the first address range may be associated with a corresponding chip select terminal 73. Likewise, the second address range may be associated with the same or a different corresponding chip select terminal 73.

In one embodiment of the present invention, chip select control register 50 (see FIG. 2 and FIG. 3) contains MUX control bits 96. These bits are used to selectively force a multiplexed external bus cycle even when the pin configuration control bits 100 have selected the non-multiplexed mode. Each one of the MUX control bits 96 is associated with one of the option registers 46 and with one of the base address registers 48.

In an alternate embodiment of the present invention, there may be any number of MUX control bits 96. Also, in alternate embodiments of the present invention, one or more MUX control bits 96 alone may determine whether or not an external bus cycle is multiplexed or non-multiplexed. That is, in alternate embodiments of the present invention, the MUX control bits 96 may be used independently of any chip select circuitry which may be included in data processing system 10.

In one embodiment of the present invention, circuitry 62 receives the match signals from comparator 42 and the MUX control bits 96 from chip select control register 50. If the match signal for a corresponding option register 46 and a corresponding base register 48 is asserted, and the corresponding one of MUX control bits 96 is also asserted, and the pin configuration control bits 100 specify non-multiplexed pin configuration mode (i.e. pin configuration signal 82 is asserted), then the output of AND-gate 69 will be asserted and will cause multiplexer 68 to execute a multiplexed external bus cycle. For example, if conductors 82, 83 and 86 are asserted, or conductors 82, 84 and 87 are asserted, or conductors 82, 85 and 88 are asserted, a multiplexed bus cycle will be executed.

If the match signal for a corresponding option register 46 and a corresponding base register 48 is asserted, and the corresponding one of MUX control bits 96 is negated, the output of OR-gate 67 will be a logic level zero and the output of AND-gate 69 will be a logic level zero. If the output of AND-gate 69 is a logic level zero, multiplexer 68 will use the pin configuration signal 82 to determine whether the external bus cycle is to be a multiplexed bus cycle or a non-multiplexed bus cycle.

Note that in one embodiment of the present invention, external bus cycles will still be performed even if no match signal 86–88 has been asserted. In this embodiment, multiplexer 68 does not need to receive the match signals from comparator 42. However, in an alternate embodiment of the present invention, if all of the match signals 86–88 are negated, then no external bus cycle will be performed. And in this embodiment, multiplexer 68 does need to receive the match signals from comparator 42.

In one embodiment of the present invention, if the pin configuration control bits 100 specify multiplexed pin configuration mode (i.e. pin configuration signal 82 is negated), all external bus cycles will be executed as multiplexed bus cycles, regardless of the value of the MUX control bits 96.

In the embodiment of the present invention illustrated in FIG. 2, if the output of AND-gate 69 is asserted, a multiplexed bus cycle will be executed. And if the output of AND-gate 69 is negated, but one of the match signals has been asserted, the logic level of pin configuration signal 82 determines whether the external bus cycle is a multiplexed bus cycle or a non-multiplexed bus cycle.

When a multiplexed external bus cycle is executed using address/data terminals 72, address signals are transferred first by way of address/data terminals 72; then in a subsequent portion of the same bus cycle, data signals are transferred by way of the same address/data terminals 72. When a non-multiplexed external bus cycle is executed using address/data terminals 72 and data terminals 74, address signals are transferred by way of address/data terminals 72; while during the same bus cycle, data signals are transferred by way of data terminals 74.

Multiplexer 68 is used to control the transfer of control signals between control signal conductors 58 and control terminals 75. Multiplexer 68 is used to control the transfer of data signals between data signal conductors 56 and data terminals 74. Likewise, multiplexer 68 is used to control the transfer of data signals between data signal conductors 56 and address/data terminals 72. Also, multiplexer 68 is used to control the transfer of address signals between address signal conductors 54 and address/data terminals 72.

As an example, for a multiplexed external write access, multiplexer 68 first causes address signals 54 to be transferred on address/data terminals 72, and then causes data signals 56 to be transferred on address/data terminals 72. For a non-multiplexed external write access, multiplexer 68 causes address signals 54 to be transferred on address/data terminals 72 during the same bus cycle that data signals 56 are transferred on data terminals 74. For both multiplexed and non-multiplexed external accesses, control signals 58 will be transferred on control terminals 75, although the timing and function of some of these control signals may change depending on the inputs to multiplexer 68.

While the present invention has been illustrated and described with reference to specific embodiments, further modifications and improvements will occur to those skilled in the art. For example, in alternate embodiments of the present invention, data processing system 10 may be any type of data processing system which includes address/data terminals 72 and data terminals 74 for performing both multiplexed and non-multiplexed external bus cycles. In one embodiment, data processing system 10 may be a microcomputer integrated circuit. In alternate embodiments of the present invention, data processing system 10 may have different blocks of circuitry than those illustrated in FIG. 1. In addition, in alternate embodiments of the present invention, address/data terminals 72 and data terminals 74 may not be included as part of system integration circuitry 16, but may be located anywhere in data processing system 10.

In alternate embodiments of the present invention, multiplexed bus cycles may use one of either the address bus or the data bus to transfer both the address signals and the data signals. For example, in an alternate embodiment of the present invention, data terminals 74 may instead be address terminals 74 which transfer address signals for non-multiplexed bus cycles. Thus, in this embodiment of the present invention, the address/data terminals 72 may be used to transfer data signals for non-multiplexed bus cycles, and the address terminals 74 may be used to transfer address signals for non-multiplexed bus cycles. Note that for multiplexed bus cycles, the address/data terminals 72 will still be used to transfer both address and data cycles.

In alternate embodiments of the present invention, the logic gates in circuit 62 may be replaced with different circuit elements. In the simplest form, the present invention may have one control bit which determines whether an external bus cycle will use multiplexed address and data signals, or non-multiplexed address and data signals. In more complex embodiments of the present invention, other control bits (e.g. pin configuration control bits 100) may be used as well.

In an alternate embodiment of the present invention, a first address range can be permanently fixed to use only multiplexed bus cycles, while a second address range can be permanently fixed to use only non-multiplexed bus cycles. Of course, in some embodiments of the present invention, some address ranges may be permanently fixed, while others may be user programmable in regard to multiplexed and non-multiplexed bus cycles. Note that in this context, the address range may also be qualified by other control signals (e.g. function code signals, size signals, read/write signals, etc.).

In an alternate embodiment of the present invention, either or both the multiplexed bus cycles and the non-multiplexed bus cycles may use a burst mode which transfers a plurality of data values for each address value.

Note that in an alternate embodiment of the present invention, the number of terminals required to provide the external bus data signals may be different than the number of terminals required to provide the external bus address signals. If the number of terminals required is different, only a portion of the external bus terminals may be needed to multiplex the external bus address signals and the external bus data signals.

It is to be understood, therefore, that this invention is not limited to the particular forms illustrated and that the appended claims cover all modifications that do not depart from the spirit and scope of this invention.

We claim:

1. A data processing system, comprising:

a first plurality of bus terminals;

a second plurality of bus terminals;

a first control register portion for storing a first control value, said first control register portion selecting a non-multiplexed mode if the first control value has a first mode value and selecting a multiplexed mode if the first control value has a second mode value;

a second control register portion for storing a second control value, said second control register portion selecting the non-multiplexed mode if the second control value has the first mode value and selecting the multiplexed mode if the second control value has the second mode value;

a comparator for determining if a plurality of address signals is within a first predetermined address range and for determining if the plurality of address signals is within a second predetermined address range, said comparator providing a comparison result value; and control means for receiving the first and second control values and for receiving the comparison result value, if the first control value has the first mode value and the comparison result value indicates that the plurality of address signals is within the first predetermined address range, said control means transfers the plurality of address signals on said first plurality of bus terminals and transfers a plurality of data signals on said second plurality of bus terminals, if the first control value has the second mode value and the comparison result value indicates that the plurality of address signals is within the first predetermined address range, said control means transfers the plurality of address signals on a predetermined one of the first plurality of bus terminals and the second plurality of bus terminals and transfers the plurality of data signals on said predetermined one of the first plurality of bus terminals and the second plurality of bus terminals, if the second control value has the first mode value and the comparison result value indicates that the plurality of address signals is within the second predetermined address range, said control means transfers the plurality of address signals on said first plurality of bus terminals and transfers the plurality of data signals on said second plurality of bus terminals if the second control value has the second mode value and the comparison result value indicates that the plurality of address signals is within the second predetermined address range, said control means transfers the plurality of address signals on said predetermined one of the first plurality of bus terminals and the second plurality of bus terminals and transfers the plurality of data signals on said predetermined one of the first plurality of bus terminals and the second plurality of bus terminals, said control means being coupled to said first plurality of bus terminals to said second plurality of bus terminals, to said first and second control register portions, and to said comparator.

2. A data processing system as in claim 1, further comprising:

a processor, coupled to said first and second control register portions; and chip select generation circuitry, coupled to said comparator, said chip select generation circuitry providing a first chip select signal corresponding to the first control register portion and providing a second chip select signal corresponding to the second control register portion; and wherein said first and second control register portions are write accessible by said processor.

3. A data processing system as in claim 1, wherein the first and second predetermined address ranges are user programmable.

4. A data processing system as in claim 3, further comprising:

a third control register portion for selectively overriding the first and second control register portions and for selectively forcing a predetermined one of the multiplexed and non-multiplexed modes.

5. A data processing system as in claim 2, further comprising:

a chip select terminal for transferring, external to the data processing system, the first chip select signal, said chip select terminal being coupled to said chip select generation circuitry.

6. A data processing system as in claim 1, wherein said control means comprises:

a multiplexer, coupled to the first plurality of bus terminals and to the second plurality of bus terminals.

7. A data processing system as in claim 1, further comprising:

an address bus, coupled to said predetermined one of the first plurality of bus terminals and the second plurality of bus terminals; and a data bus, coupled to said predetermined one of the first plurality of bus terminals and the second plurality of bus terminals.

8. A data processing system as in claim 1, further comprising:

a base address register corresponding to the first control register portion, said base address register storing a base address value, said base address register being coupled to said comparator.

9. A data processing system as in claim 8, wherein said comparator compares at least a portion of the plurality of address signals to at least a portion of the base address value and asserts a match signal if the at least a portion of the plurality of address signals and the at least a portion of the base address value have a same value.

10. A data processing system as in claim 1, wherein said data processing system is formed on a single integrated circuit.

11. A data processing system as in claim 10, further comprising:

a control bus, coupled to said comparator, said control bus transferring a plurality of control signals.

12. A data processing system as in claim 11, further comprising:

an option register corresponding to the first control register portion, said option register storing an option value, said option register being coupled to said comparator.

13. A method for providing address and data signals in a data processing system having a first bus and a second bus, the method comprising the steps of:

storing a first control value in a first control register portion;

initiating a first bus cycle in response to receiving a first plurality of address signals;

if the first control value is a first mode value and if the first plurality of address signals is within a predetermined address range, transferring the first plurality of address signals on the first bus and transferring a first plurality of data signals on the second bus during the first bus cycle;

if the first control value is a second mode value and if the first plurality of address signals is within the predetermined address range, transferring the first plurality of address signals on a predetermined one of the first bus and the second bus and transferring the first plurality of data signals on said predetermined one of the first bus and the second bus during the first bus cycle;

initiating a second bus cycle in response to receiving a second plurality of address signals;

if the first control value is the first mode value and if the second plurality of address signals is within the predetermined address range, transferring the second plurality of address signals on the first bus and transferring a second plurality of data signals on the second bus during the second bus cycle; and if the first control value is the second mode value and if the second plurality of address signals is within the predetermined address range, transferring the second plurality of address signals on said predetermined one of the first bus and the second bus and transferring the second plurality of data signals on said predetermined one of the first bus and the second bus during the second bus cycle;

storing a second control value in a second control register portion;

initiating a third bus cycle in response to receiving a third plurality of address signals;

if the second control value is the first mode value and if the third plurality of address signals is within a second predetermined address range, transferring the third plurality of address signals on the first bus and transferring a third plurality of data signals on the second bus during the third bus cycle; and if the second control value is the second mode value and if the third plurality of address signals is within the second predetermined address range, transferring the third plurality of address signals on a predetermined one of the first bus and the second bus and transferring the third plurality of data signals on said predetermined one of the first bus and the second bus during the third bus cycle; and wherein the first bus cycle and the second bus cycle are adjacent bus cycles.

14. A method as in claim 13, further comprising the step of:

if the first plurality of address signals is within the predetermined address range, asserting a first chip select signal during the first bus cycle.

15. A method as in claim 13, wherein said first and second control register portions are located within a same register.

16. A method as in claim 13, further comprising the steps of:

storing a third control value in a third control register portion; and in response to the third control value, selectively overriding the first and second control register portions and selectively forcing a predetermined one of the multiplexed and non-multiplexed modes.

17. A method as in claim 13, further comprising the step of:

providing, external to the data processing system, the first bus and the second bus.

18. A method as in claim 13, further comprising the steps of:

asserting a first chip select signal during the first bus cycle;

asserting the first chip select signal during the second bus cycle; and asserting a second chip select signal during the third bus cycle.

19. A method as in claim 13, further comprising the steps of:

comparing at least a portion of the first plurality of address signals to at least a portion of a first base address value; and comparing at least a portion of the second plurality of address signals to the at least a portion of the first base address value.

20. An integrated circuit, comprising:

a first plurality of bus terminals;

a second plurality of bus terminals;

a first control register portion for storing a first control value, said first control register portion selecting a non-multiplexed mode if the first control value has a first mode value and selecting a multiplexed mode if the first control value has a second mode value;

a second control register portion for storing a second control value, said second control rester portion selecting the non-multiplexed mode if the second control value has the first mode value and selecting the multiplexed mode if the second control value has the second mode value;

a comparator for determining if a plurality of address signals is within a first predetermined address range and for determining if the plurality of address signals is within a second predetermined address range, said comparator providing a comparison result value;

control circuitry for receiving the comparison result value, if the comparison result value indicates that the plurality of address signals is within the first predetermined address range and the first control value has the first mode value, said control circuitry transfers the plurality of address signals on said first plurality of bus terminals and transfers a plurality of data signals on said second plurality of bus terminals, the comparison result value indicates that the plurality of address signals is within the first predetermined address range and the first control value has the second mode value, said control circuitry transfers the plurality of address signals on a predetermined one of the first plurality of bus terminals and the second plurality of bus terminals and transfers the plurality of data signals on said predetermined one of the first plurality of bus terminals and the second plurality of bus terminals, if the comparison result value indicates that the plurality of address signals is within the second predetermined address range and the second control value has the first mode value, said control circuitry transfers the plurality of address signals on said first plurality of bus terminals and transfers the plurality of data signals on said second plurality of bus terminals, if the comparison result value indicates that the plurality of address signals is within the second predetermined address range and the second control value has the second mode value, said control circuitry transfers the plurality of address signals on said predetermined one of the first plurality of bus terminals and the second plurality of bus terminals and transfers the plurality of data signals on said predetermined one of the first plurality of bus terminals and the second plurality of bus terminals, said control circuitry being coupled to said first plurality of bus terminals, to said second plurality of bus terminals, to said first control register portion, and to said comparator; and chip select generation circuitry, coupled to said comparator, said chip select generation circuitry providing a first chip select signal if the comparison result value indicates that the plurality of address signals is within the first predetermined address range, said chip select generation circuitry providing a second chip select signal if the comparison result value indicates that the plurality of address signals is within the second predetermined address range.

21. A method for operating a data processing system having a first bus and a second bus, the method comprising the steps of:

initiating a first bus cycle in response to receiving a first plurality of address signals;

if the first plurality of address signals is within a first predetermined address range, selecting operation of the first and second busses to be multiplexed if a first control register portion stores a first value, and selecting operation of the first and second busses to be non-multiplexed if the first control register portion stores a second value;

if the first plurality of address signals is within the first predetermined address range, providing a first chip select signal during the first bus cycle;

if the first plurality of address signals is within a second predetermined address range, selecting operation of the first and second busses to be multiplexed if a second control register portion stores a third value, and selecting operation of the first and second busses to be non-multiplexed if the second control register portion stores a fourth value;

if the first plurality of address signals is within the second predetermined address range, providing a second chip select signal during the first bus cycle;

initiating a second bus cycle in response to receiving a second plurality of address signals;

if the second plurality of address signals is within the first predetermining address range selecting operation of the first and second busses to be multiplexed if the first control register portion stores the first value, and selecting operation of the first and second busses to be non-multiplexed if the first control register portion stores the second value;

if the second plurality of address signals is within the first predetermined address range, providing the first chip select signal during the second bus cycle;

if the second plurality of address signals is within the second predetermined address range, selecting operation of the first and second busses to be multiplexed if the second control register portion stores the third value, and selecting operation of the first and second busses to be non-multiplexed if the second control register portion stores the fourth value;

if the second plurality of address signals is within the second predetermined address range, providing the second chip select signal during the second bus cycle;

if operation of the first and second busses has been selected to be non-multiplexed during the first bus cycle, transferring the first plurality of address signals on the first bus and transferring a first plurality of data signals on the second bus during the first bus cycle; and if operation of the first and second busses has been selected to be multiplexed during the second bus cycle, transferring the first plurality of address signals on a predetermined one of the first bus and the second bus and transferring the first plurality of data signals on said predetermined one of the first bus and the second bus during the second bus cycle; and wherein the first bus cycle and the second bus cycle are adjacent bus cycles.

* * * * *